United States Patent [19]

Zimmermann

[11] Patent Number: 5,365,155

[45] Date of Patent: Nov. 15, 1994

[54] ROTATIONAL SPEED CONTROL AND USE OF SAME TO CONTROL THE ROTATIONAL SPEED OF AN ELECTRIC HAND TOOL MOTOR

[75] Inventor: Bernward Zimmermann, Tuttlingen, Germany

[73] Assignee: Marquardt GmbH, Rietheim-Weilheim, Germany

[21] Appl. No.: 12,139

[22] Filed: Jan. 29, 1993

Related U.S. Application Data

[63] Continuation-in-part of Ser. No. 600,774, Oct. 22, 1990, abandoned.

[51] Int. Cl.⁵ .............................................. H02P 7/00
[52] U.S. Cl. .................................. 318/268; 388/937; 388/838
[58] Field of Search ................ 318/268, 257; 388/802, 388/807, 824, 937, 838; 200/172, 26, 61.4, 64.46, 505; 338/32 H, 32 R, 162; 310/96; 81/469, 473, 479, 57.11

[56] References Cited

U.S. PATENT DOCUMENTS

| | | | |
|---|---|---|---|
| 2,843,763 | 7/1958 | Kafka et al. | 307/83 |
| 2,980,839 | 4/1961 | Haeussermann | 318/138 |
| 3,386,067 | 5/1968 | Costanzo | 338/100 |
| 3,463,990 | 8/1969 | Ross | 318/335 |
| 3,626,222 | 12/1971 | Dischler | 310/96 |
| 3,641,410 | 2/1972 | Vogelsberg | 318/345 |
| 4,175,247 | 11/1979 | Klemm | 318/466 |
| 4,241,298 | 12/1980 | Trammell, Jr. et al. | 318/17 |
| 4,425,557 | 1/1984 | Nakamura | 338/32 H |
| 4,433,321 | 2/1984 | Widdowson | 338/42 |
| 4,780,655 | 10/1988 | Layh | 318/468 |
| 4,835,509 | 5/1989 | Yoshino et al. | 338/32 R |
| 4,936,148 | 6/1990 | Shaw et al. | 338/32 H |
| 5,014,793 | 5/1991 | Germanton et al. | 81/473 X |

FOREIGN PATENT DOCUMENTS

| | | |
|---|---|---|
| 2044636 | 2/1971 | France . |
| 2078724 | 11/1971 | France . |
| 2135777 | 2/1973 | Germany . |
| 7620975 | 7/1976 | Germany . |
| 2649251 | 5/1978 | Germany . |
| 2918415 | 8/1983 | Germany . |
| 210508 | 6/1984 | Germany . |
| 3314316 | 10/1984 | Germany . |
| 239048 | 9/1986 | Germany . |
| 3607670 | 9/1987 | Germany . |
| 585989 | 3/1977 | Switzerland . |
| 2061020 | 5/1971 | United Kingdom . |

OTHER PUBLICATIONS

"Digitale und Lineare Hallsensoren," (Digital and Linear Hall Sensors), Honeywell Micro Switch, in GEO-M-0114, Jun. 1983, pp. 1–16.
"Hallgeneratoren und Feldplatten," (Hall Generators and Field Plates) Teichmann et al., in *Elektronik*, No. 9, Jun. 5th, 1983, pp. 107–112.

*Primary Examiner*—Jonathan Wysocki
*Attorney, Agent, or Firm*—Spencer, Frank & Schneider

[57] ABSTRACT

The process of controlling rotational speed of an electric motor of an electric hand tool, including providing an electric motor of an electric hand tool with a rotational speed control comprised of displacement means for providing displacement in response to manual operation of the electric hand tool selected from the group consisting essentially of a linear displacement device for providing linear displacement (s) and an actuating dial for providing arcuate displacement (S); an elastic membrane to which the displacement means is articulatedly connected so that during displacement of the displacement means the elastic membrane deforms as a function of the displacement; actuating means comprising a sensor element coupled to the elastic membrane so that the sensor element produces an electrical output variable as a function of the deformation of the elastic membrane, the sensor element being selected from the group consisting essentially of a Hall sensor, an inductive sensor, and a sensor switch; and an electronic switch for rotational speed control connected to the actuating means, from which it receives the electrical output variable, and to the electric motor of the electric hand tool; and manually operating the displacement means of the rotational speed control to control the rotational speed of the electric motor.

26 Claims, 3 Drawing Sheets

ROTATIONAL SPEED CONTROL AND USE OF SAME TO CONTROL THE ROTATIONAL SPEED OF AN ELECTRIC HAND TOOL MOTOR

CROSS REFERENCE TO RELATED APPLICATIONS

This application is a continuation-in-part of U.S. application Ser. No. 07/600,774 filed Oct. 22nd, 1990, abandoned, which claims the priority of application Ser. No. P 39 34 950.0 filed Oct. 20th, 1989 in Germany, the subject matter of which is incorporated herein by reference.

BACKGROUND OF THE INVENTION

1. Field of the Invention

The invention relates to a rotational speed control for electric motors of electric hand tools having a push-button or actuating dial, the respectively linear or arcuate displacement of which acts on an actuating element in order to vary an electrical output variable, with an electronic switch for speed control of the electric motor being connected downstream of the actuating element.

2. Background of The Art

Electric tools, such as drills, drill hammers, saber saws, orbital sanders, etc. have been equipped for several years with electronic switches which permit a continuous variation of the speed. In these tools, an actuating element which brings about a change of an electrical output variable is constantly actuated in use via a push-button or via an actuating dial. The actuating element used has heretofore always been a potentiometer which is constructed as part of the electronic switch or as part of an electronic module. The push-button or the actuating dial of the electronic switch is then provided with a potentiometer slide which, as a result of the linear displacement of the push-button or the circular displacement of the dial, slides on a correspondingly shaped potentiometer path. Movement of the potentiometer slide along a linear or non-linear (e.g., logarithmic) potentiometer path in the case of the push-button embodiment or a circular potentiometer path in the case of the actuating dial embodiment brings about a corresponding change in resistance. The respective momentary resistance value serves as a manipulated electrical variable transmitted to the subsequent control electronics which brings about a speed control of the electric motor, for example, via a phase control. In this respect, the potentiometer supplies a voltage, current or resistance which is proportional to the displacement of the push-button or actuating dial.

Such potentiometers are thus subjected to a large degree of wear in use due to abrasion, dust, vibration, etc. which reduces the useful life of the electric hand tool. Furthermore, only potentiometers with resistance values which have relatively high tolerances can be economically produced in large numbers using presently used production methods. In this process, the carrier material used, e.g., hard paper, ceramics, and the resistance paste used essentially determine the quality and the price of the potentiometer.

Thus, it is an object of the present invention to provide a rotational speed control for electric hand tools which avoids the previously mentioned disadvantages by dispensing with the use of a potentiometer and employing instead an actuating element including a sensor element which is largely made of non-wearing parts and which is part of a sensor circuit.

It is a further object of the present invention to effectively use the rotational speed control above to control the rotational speed of an electric hand tool motor.

SUMMARY OF THE INVENTION

These and other objects are accomplished by the present invention which provides a rotational speed control for electric motors of electric hand tools, comprising displacement means for providing displacement in response to manual operation of the electric hand tool selected from the group consisting essentially of a linear displacement device for providing linear displacement (s) and an actuating dial for providing arcuate displacement (S); an elastic membrane to which the displacement means is articulatedly connected so that during displacement of the displacement means the elastic membrane deforms as a function of the displacement; actuating means comprised of a sensor element coupled to the elastic membrane so that the sensor element produces an electrical output variable as a function of the deformation of the elastic membrane, the sensor element being selected from the group consisting essentially of a Hall sensor, an inductive sensor, and a sensor switch; and an electronic switch for rotational speed control connected to the actuating means, from which it receives the electrical output variable, and to the electric motor of the electric hand tool.

The rotational speed control according to the invention thus includes a sensor circuit coupled to an elastic membrane which deforms in response to displacement thereof for providing rotational speed control for an electric motor of an electric hand tool via an electronic switch, comprising a sensor element coupled to the elastic membrane so that the sensor element produces an electrical output variable as a function of the deformation of the elastic membrane, the sensor element being selected from the group consisting essentially of a Hall sensor, an inductive sensor and a sensor switch; and means for transmitting the electrical output variable from the sensor element to the electronic switch.

The rotational speed control according to the invention may be effectively used to control the rotational speed of an electric hand tool motor.

Thus, according to the invention, substantially non-wearing sensors are used as actuating means for regulating the rotational speed of electric hand tools, with a push-button or an actuating dial being articulatedly connected to an elastic membrane and the sensor element being coupled to the elastic membrane, so that displacement of the push-button or actuating dial effects a deformation of the elastic membrane and this, in turn, effects a change in the electrical output variable given off by the sensor element. Utilization of such sensors, particularly in combination with an elastic membrane, extends the service life of the tools by making possible substantially non-wearing operation which is particularly resistant to the effects of abrasion and dust. As a result, the technical and electrical characteristics of the actuating means remain constant over the tools' working life and the impact of external influences are lessened. The use of a sensor element as actuating means for a speed control also has the advantage that production tolerances can be relaxed.

BRIEF DESCRIPTION OF THE DRAWINGS

Further details and advantages of the invention are explained in the following description of various exemplary embodiments, in which.

DESCRIPTION OF THE PREFERRED EMBODIMENTS

According to the embodiments illustrated in the figures, the respective sensors supply the following electrical signals:

(a) an electrical output variable, e.g., voltage, current, or resistance, which varies directly as a function of the displacement of the push-button or the dial;

(b) an electrical output variable associated with the displacement of the push-button indirectly via a pressure P; and (c) an electrical output variable associated with a pressure P via a modified push-button.

These different signals are measurable and can be achieved with various sensors.

Figure 1:
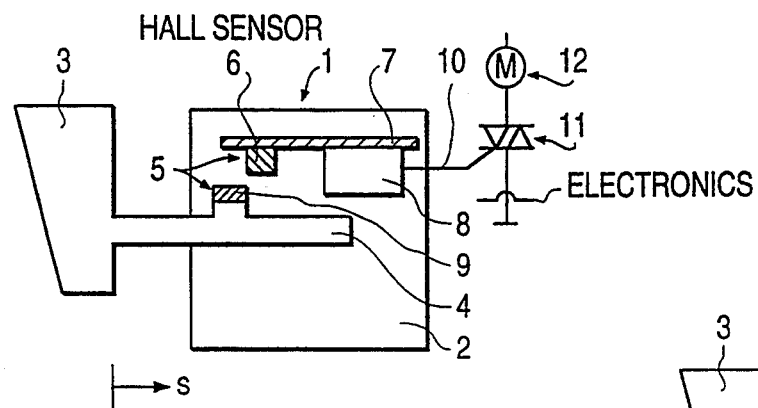
FIG. 1 schematically illustrates a rotational speed control having a push-button displacement means and a sensor element constructed according to the Hall principle.

FIG. 1 schematically illustrates a speed control which operates according to the Hall principle. For this purpose, rotational speed control 1 includes of a housing 2 out of which a push-button 3 projects for manual activation of the electric hand tool. Push-button 3 has a tappet 4 which is longitudinally displaceable via the push-button 3 along path s.

Hall sensor 5 includes a semiconductor layer 6 and a magnetic conducting piece 9. Semiconductor layer 6, through which a current flows, is positioned in a stationary position on a printed circuit board 7. Printed circuit board 7 also includes evaluation electronics 8 represented diagrammatically. Magnetic conducting piece 9 is positioned on tappet 4 and is longitudinally displaceable so as to move parallel to the stationary semiconductor layer 6 of the Hall sensor 5.

The electrical output variable generated by the Hall sensor 5 is transmitted to evaluation electronics 8. Evaluation electronics 8 includes an electronic switch and supplies, via lead 10, control variables to a phase control 11 for controlling the rotational speed of electric motor 12.

Magnetic conducting piece 9 is thus movable and has a low-retentivity. This low-retentivity property of magnetic conducting piece 9 brings about a magnetic field which is displaceable over the semiconductor layer 6, which, according to the known Hall effect, generates a Hall voltage. This results generally from the fact that, in a conductor piece through which a current flows and which is permeated by a magnetic field perpendicular to the direction of the current, the paths of the charge carriers are reflected. At the end faces of the conductor piece, which lie opposite one another and perpendicular to the direction of the current and magnetic field, the so-called Hall voltage therefore occurs which is proportional to the current and to the magnetic induction. Displacement of push-button 3 thus displaces the magnetic field of the magnetic conducting piece 9 as it passes over the semiconductor layer 6 and brings about a change in the Hall voltage. This variable Hall voltage is evaluated in evaluation electronics 8 in any of several well-known ways and used to control the speed of electric motor 12.

Figure 2:
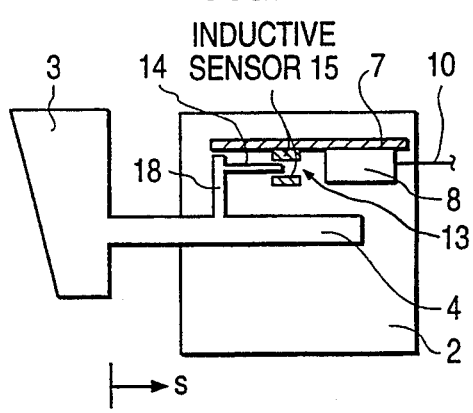
FIG. 2 schematically illustrates a rotational speed control having a push-button displacement means and an inductive sensor.

In the exemplary embodiment of a rotational speed control according to FIG. 2, actuating means 13 is constructed as an inductive sensor 13 including a thin, soft-iron rod 14 and a coil 15 through which a current flows. The longitudinal displacement of push-button 3 and tappet 4 brings about a displacement s of a metal component, in particular, the thin, soft-iron rod 14, inside the coil 15. This produces a change in the inductance of the coil 15 which is the electrical output variable which is fed in turn to diagrammatically-illustrated, evaluation electronics 8 via leads provided on printed circuit board 7. The speed control of the motor 12 (shown in FIG. 1) occurs via lead 10.

As for the exemplary embodiment according to FIG. 1, the longitudinal movement of push-button 3 over longitudinal displacement path s in the embodiment of FIG. 2 is also converted into an electrical output variable by a sensor element. During this process, an electrical output variable to be associated with the displacement s and which can be used to control the speed of the motor arises at the sensor element.

Figure 3A:
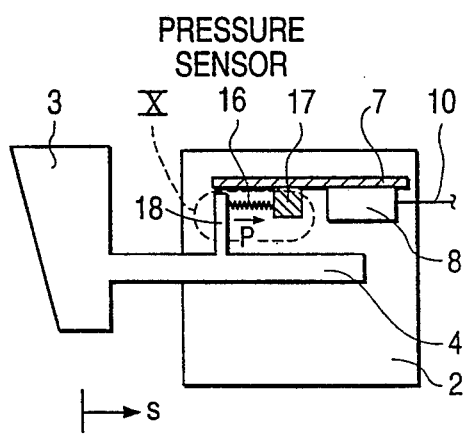
FIG. 3a schematically illustrates a rotational speed control having a push-button displacement means and a sensor element which is a pressure sensor.
Figure 3B:
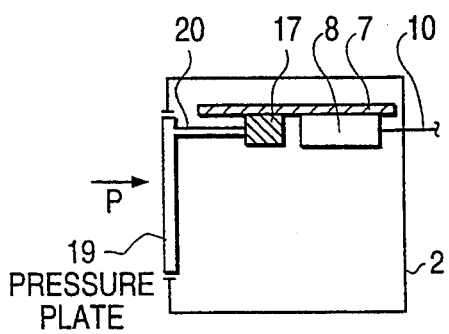
FIG. 3b schematically illustrates a rotational speed control having a pressure plate displacement means and a sensor element which is a pressure sensor.

In the exemplary embodiment according to FIGS. 3a and 3b, pressure sensors are used. In the exemplary embodiment according to FIG. 3a, tappet 4 of push-button 3 acts via a spring 16 on sensor 17. In this case, as a result of the movement of the push-button, a pressure P which can be associated with the displacement s arises at sensor 17 which may be a pressure sensor 17. An electrical output variable, e.g., voltage or current, arises at pressure sensor 17 which is thus associated with the displacement s. Said output variable is fed via leads provided on printed circuit board 7 to diagrammatically-illustrated, evaluation electronics 8. The coupling of tappet 4 to the spring 16 occurs in a manner analogous to that in the exemplary embodiment according to FIG. 2 by means of a rigid extension arm 18.

Sensor 17 shown schematically within area X in FIG. 3a is preferably acted upon via an elastic membrane 30 to which the displacement means, here shown as push-button 3, tappet 4, extension 18 and spring 16, is articulatedly connected, as shown in greater detail in FIGS.

5, 6 and 7. Thus, while FIG. 3a shows sensor 17 as a pressure sensor 17, FIG. 5 shows an inductive sensor 17a, FIG. 6 shows a Hall sensor 17b, and FIG. 7 shows a sensor switch 17c.

Figure 5:
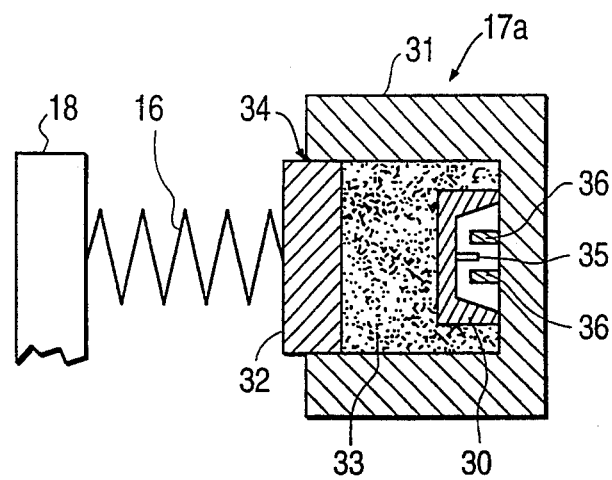
FIG. 5 schematically illustrates an enlarged view of detail X from FIG. 3a in which the sensor element is configured in this embodiment as an inductive sensor.

In FIG. 5, the articulated connection to the elastic membrane 30, which is inside housing 31 of inductive sensor 17a, occurs via a tappet 32, which is movably mounted in an opening 34 of housing 31, and to which the end of spring 16 opposite extension 18 is fastened. Tappet 32 acts on an elastic intermediate layer 33, which is preferably made of an elastomer, in order to compensate for point charges caused by unevennesses of tappet 32 or membrane 30, as well as to compensate for jamming of tappet 32.

Figure 6:
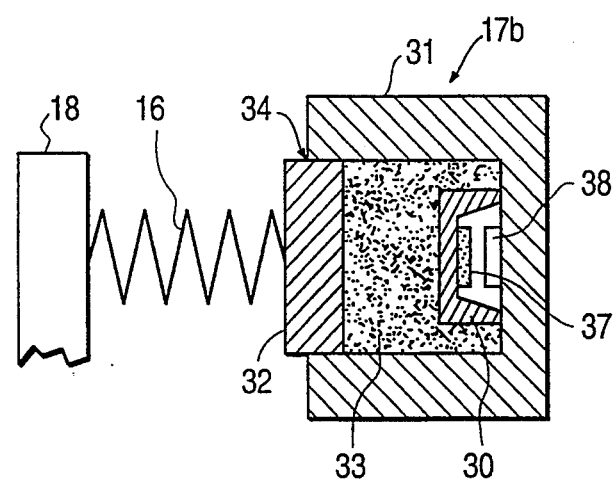
FIG. 6 schematically illustrates an enlarged view of detail X from FIG. 3a in which the sensor element is configured in this embodiment as a Hall sensor.
Figure 7:
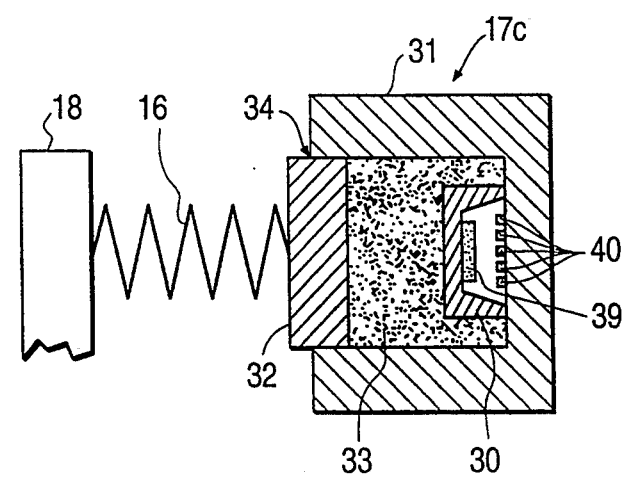
FIG. 7 schematically illustrates an enlarged view of detail X from FIG. 3a in which the sensor element is a sensor switch including resistors and conductor strips.

If push-button 3 (see FIG. 3a) is now displaced, a force acts upon tappet 32 via spring 16 as shown in FIGS. 5, 6 and 7. This force continues via the elastic intermediate layer 33 and acts upon the surface of elastic membrane 30. This in turn effects a deformation of elastic membrane 30. The extent of the deformation depends upon the displacement of the push-button 3.

The actuating means in the exemplary embodiment of FIG. 5 is configured as an inductive sensor 17a analogous to the embodiment according to FIG. 2. A metal component 35, positioned on the side of elastic membrane 30 which faces away from elastic intermediate layer 33, descends into a coil 36, through which a current flows and which is positioned in the immediate vicinity of elastic membrane 30. This results in the coupling of elastic membrane 30 to the actuating means by means of metal component 35 of inductive sensor 17a analogous to that obtained by thin, soft-iron rod 14 in FIG. 2. Depending on the deformation of elastic membrane 30, metal component 35 will penetrate coil 36 and will be located at different distances within coil 36 so that the inductivity of coil 36 thus depends on the deformation of elastic membrane 30. The inductivity of coil 36 is the electrical output variable which is transmitted from inductive sensor 17a to evaluation electronics 8 via leads provided on printed circuit board 7. Being coupled with the deformation of elastic membrane 30, the output variable is thus in a direct functional interrelationship with the deformation of elastic membrane 30.

The actuating means in the exemplary embodiment of FIG. 6 is configured as a Hall sensor 17b constructed according to the Hall principle analogous to the embodiment shown in FIG. 1. Elastic membrane 30 is covered with a soft magnetic layer 37 on the side thereof facing away from elastic intermediate layer 33, as shown in detail in FIG. 6. This results in the coupling of elastic membrane 30 with Hall sensor 17b. In the immediate vicinity of elastic membrane 30, a semiconductor layer 38, through which a current flows, is provided on an inner surface of housing 31. In correspondence with the deformation of elastic membrane 30, together with the soft magnetic layer 37, a magnetic field is formed which changes over the semiconductor layer 38. This magnetic field in turn produces a Hall voltage in semiconductor layer 38 as a function of the deformation of elastic membrane 30. This Hall voltage then serves directly as the electrical output variable which is transmitted to evaluation electronics 8 for controlling the speed of the motor.

Figure 8:
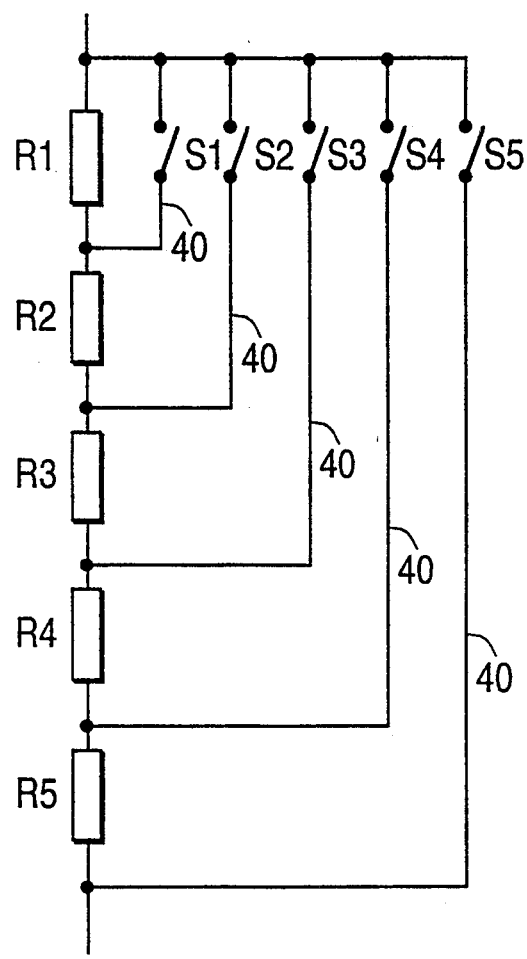
FIG. 8 is a circuit diagram of the principle for the sensor element according to FIG. 7.

In the exemplary embodiments shown in FIGS. 5 and 6, the functional interrelationship of the electrical output value produced by the sensor element and the deformation of elastic membrane 30 is essentially of a continuing type. In a further, particularly preferred embodiment shown in FIG. 7, the electrical output variable takes a step-like course. Sensor element 17c is a sensor switch 17c according to the embodiment of FIG. 7 and includes a plurality of electrical resistors, shown as resistors R1 to R5, which are arranged in series and whose principle is shown in the circuit diagram of FIG. 8. As shown in FIG. 8, resistors R1 to R5 are bridged by conductor strips 40 within which switch elements S1 to S5 are defined and are shown as open sections within conductor strips 40. Deformation of elastic membrane 30 causes an electrically conductive metal layer 39 to contact individual conductor strips 40 in proportion to the extent of the deformation and to close one or more of switch elements S1 to S5 by bridging the gap thereof. Thus, depending on the number of closed switch elements S1 to S5, a voltage drop occurs which represent(s) the electrical output variable of sensor element 17c that is transmitted to evaluation electronics 8. The voltage is thus step-like when plotted against displacement path s of push-button 3 as shown in the graph presented as FIG. 9. The number of closed switch elements S1 to S5 depends on the displacement path s of push-button 3, as well as on the deformation of elastic membrane 30, so that a step-shaped functional interrelationship also exists between displacement path s and voltage drop U.

The elastic membrane 30 is coupled with sensor switch 17c by covering the side of elastic membrane 30 facing away from elastic intermediate layer 33 with an electrically conductive metal layer 39 as shown in detail in FIG. 7. Conductor strips 40 are provided on an inner surface of housing 31 opposite electrically conductive metal layer 39. Conductor strips 40 lead to and connect with resistors R1 to R5 shown more clearly in FIG. 8. Resistors R1 to R5 may be provided on the interior or on the exterior of housing 31, however, it is particularly advantageous to integrate resistors R1 to R5 directly into conductor strips 40 during metallization.

As is directly apparent, based on the longitudinal displacement of push-button 3, a force is transmitted via spring 16, tappet 32 and elastic intermediate layer 33 to elastic membrane 30 which results in its deformation. The degree of deformation in this case depends on displacement path s of push-button 3. Due to the deformation of the elastic membrane 30, electrically conductive metal layer 39 contacts individual conductor strips 40 in the vicinity of the respective switch elements S1 to S5 defined therein so that the greater the deformation of membrane 30, the greater the number of conductor strips 40 contacted so that, in dependence on the displacement path s and on the deformation of elastic membrane 30, switch elements S1 to S5 are closed and bridging of the respective resistors R1 to R5 is switched. In this manner, the step-shaped functional inter-relationship between voltage and displacement path s is realized as shown in the graph of FIG. 9.

Figure 9:
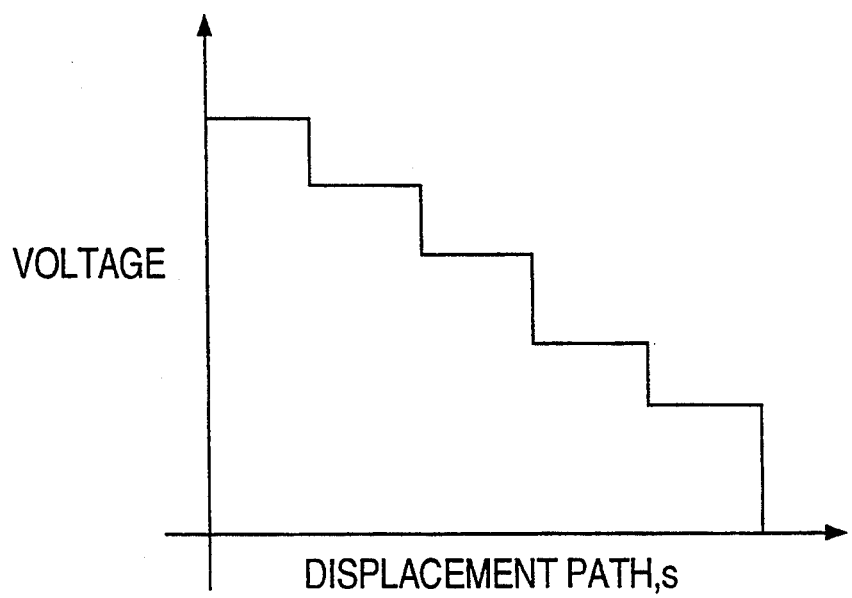
FIG. 9 is a graph of voltage as a function of displacement path s for the sensor element according to FIG. 7.

As shown in FIGS. 8 and 9, the number and height of the steps during the step-shaped course of the voltage drop depends, among other things, on the number of resistors. Based on the respective choice of resistors, the voltage drop can be matched to the desired functional circumstances, for example, the steps chosen can be so small that a "quasi continuous" voltage drop is created.

A material suitable for the elastic membrane 30 shown in FIGS. 5 to 7 is, for example, a thin metal sheet, for example, a thin metal disk. Especially advantageous and preferred, however, is the use of a membrane formed from a silicon base plate (silicon wafer) by means of anisotropic etching as is known in semiconductor technology. As a result, it is possible to produce a so-called micro-machined membrane of very small dimensions. Further, it is possible to deposit the metallizations in FIG. 7 for conductor strips 40 and electrically conductive metal layer 39 directly onto silicon membrane 30 subsequent to formation thereof, and, if desired or necessary, to integrate the resistors into silicon membrane 30, using techniques that are known from integrated circuit manufacturing. It is thus possible to produce a very small yet extraordinarily functional actuating means including sensor switch 17c in the form of an array of switches which "sense" and respond to the deformation of elastic membrane 30 for controlling the rotational speed of electric hand tools.

Membrane 30 thus functions to largely protect the coupled actuating means from external influences. In particular, dust or dirt that could adversely affect the function of the sensor element is effectively excluded. Elaborate and costly sealing measures between tappet 4 and housing 2 (see, for example, FIG. 1) are therefore not necessary. This results in significant manufacturing simplification and cost reduction for the rotational speed regulation according to the invention.

In the exemplary embodiment according to FIG. 3b, the push-button 3 of FIG. 3a is replaced by a pressure plate 19 to which a rigid tappet 20 is joined in an articulated manner. Rigid tappet 20 acts analogous to pressure spring 16 in FIG. 3 so as to apply pressure to pressure sensor 17 so that the pressure sensor 17 is, in this embodiment, rigidly connected to pressure plate 19. As a result of a pressure P being applied to the pressure plate 19, an electrical output variable arises, e.g., voltage or current, which can be associated with the pressure P at the output of the pressure sensor 17. This electrical output variable is transmitted to evaluation electronics 8 via leads provided on printed circuit board 7 and carried via lead 10 to the motor. The exemplary embodiment according to FIG. 3b thus provides an essentially displacement-free activation of pressure sensor 17.

Figure 4A:
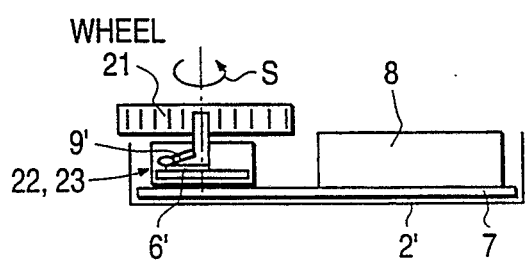
FIGS. 4a and 4b schematically illustrate, respectively, an elevational side view and a plan top view of a rotational speed control having an actuating dial displacement means and a sensor constructed according to the Hall principle or the inductive principle.
Figure 4B:
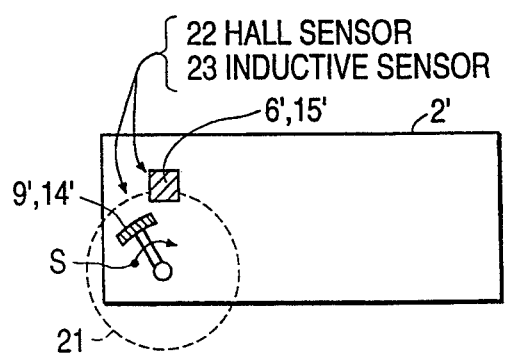

In the exemplary embodiment according to FIGS. 4a and 4b, a speed control, constructed as an electronic module with actuating dial 21 is illustrated. FIG. 4a is an elevational side view and FIG. 4b is a plan top view. The actuating dial 21 travels through an arcuate displacement path S which is normally converted via a potentiometer into an electrical output variable, i.e., into a variable resistance value. In the present invention, however, the conventional potentiometer is replaced by a sensor element 22 or 23 which converts the rotational movement of the actuating dial 21, in a contactless manner as shown in FIGS. 4a and 4b or articulated via a spring, into an electrical output variable. As can be seen in FIG. 4b, magnetic conducting piece 9' constructed according to the Hall principle, is provided which moves across stationary semiconductor layer 6' over the arcuate displacement path S and thus generates a magnetic field which migrates over semiconductor layer 6'. The mode of operation of such a Hall sensor 22 is then analogous to the description of the operation of the Hall sensor 5 in FIG. 1. As a complement to this, FIG. 4a also illustrates printed circuit board 7 and evaluation electronics 8 within a beaker housing 2'.

Instead of employing a Hall sensor 22, however, the exemplary embodiment according to FIGS. 4a and 4b can alternatively employ an inductive sensor 23 which operates according to the induction principle analogous to the description of the inductive sensor 13 in FIG. 2.

In this embodiment, inductive sensor 23 includes a stationary component which is constructed as a coil 15' and a component travelling over arcuate displacement path S which is a soft iron rod 14'. Analogously, a pressure sensor may be alternatively employed which is joined in an articulated manner via the rotational movement of the actuating dial and is articulately connected via a spring, with an eccentricity, for example, at the actuating dial, exerting force on the spring during rotation. The spring then transmits the force to an elastic membrane to which the actuating means (sensor element) is coupled, as explained in connection with FIGS. 5 to 7, so that, on account of the arcuate displacement of the actuating dial, a deformation of the elastic membrane is obtained and this deformation in turn is in a functional interrelationship with one the of the electrical output values transmitted from the sensor element.

Basically, the rotational movement of the actuating dial 21 replaces the longitudinal movement of the push-button 3. The sensors are then constructed analogously to the exemplary embodiments according to FIGS. 1 to 3 and 5 to 7.

The invention is not restricted to the illustrated and described exemplary embodiments however. Rather, it also comprises other possible sensors for use as speed controls of electrical tools. Thus, it will be understood that the above description of the present invention is susceptible to various modifications, changes and adaptations, and the same are intended to be comprehended within the meaning and range of equivalents of the appended claims.

What is claimed is:

1. A rotational speed control for electric motors of electric hand tools, comprising:
   a. displacement means for providing displacement in response to manual operation of the electric hand tool selected from the group consisting essentially of a linear displacement device for providing linear displacement (s) and an actuating dial for providing arcuate displacement (S);
   b. an elastic membrane to which the displacement means is articulatedly connected via a spring so that during displacement of the displacement means the elastic membrane deforms as a function of the displacement;
   c. actuating means comprised of a sensor element coupled to the elastic membrane so that the sensor element produces an electrical output variable as a function of the deformation of the elastic membrane, the sensor element being selected from the group consisting essentially of a Hall sensor, an inductive sensor, and a sensor switch; and
   d. an electronic switch for rotational speed control connected to the actuating means, from which it receives the electrical output variable, and to the electric motor of the electric hand tool.

2. The rotational speed control according to claim 1, wherein the displacement means comprises a push-button for providing linear displacement (s), and wherein the sensor element is a Hall sensor in which a Hall voltage is generated in use and which includes a magnetic conducting piece which is displaceable, and a semiconductor layer which is stationary and through which a current flows, the displacement (s) of the displacement means in use slidably moving the magnetic conducting piece past the semiconductor layer in a contact-less manner thereby varying the Hall voltage.

3. The rotational speed control according to claim 1, wherein the displacement means comprises a push-button for providing linear displacement (s) and has a soft-iron rod displaceably mounted thereon, and wherein the sensor element is an inductive sensor having at least one stationary coil through which current flows, the displacement (s) of the push-button in use moving the soft-iron rod past the at least one stationary coil thereby changing the inductance thereof.

4. The rotational speed control according to claim 1, wherein the displacement means comprises an actuating dial for providing arcuate displacement (S), and wherein the sensor element is a Hall sensor in which a Hall voltage is generated in use and which includes a magnetic conducting piece which is displaceable and positioned on the displacement means, and a semiconductor layer which is stationary and through which a current flows, the arcuate displacement (S) of the actuating dial in use slidably moving the magnetic conducting piece past the semiconductor layer in a contactless manner for the purpose of varying the Hall voltage.

5. The rotational speed control according to claim 1, wherein the displacement means comprises an actuating dial for providing arcuate displacement (S) and has a soft-iron rod displaceably mounted thereon, and wherein the sensor element is an inductive sensor having at least one stationary coil through which current flows, the acurate displacement (S) of the actuating dial in use moving the soft-iron rod past the at least one stationary coil thereby changing the inductance thereof.

6. The rotational speed control according to claim 1, wherein the displacement means further comprises a tappet to which one end of the spring is attached, and wherein the elastic membrane further comprises an elastic intermediate layer positioned between the tappet and the elastic membrane.

7. The rotational speed control according to claim 1, wherein the sensor element is a sensor switch and comprises a circuit to which a voltage is applied comprised of a plurality of electric resistors connected in series by a plurality of conductor strips, the conductor strips having defined therein a plurality of switching elements, and an electrically conductive metal layer provided on the elastic membrane on the side thereof remote from the displacement means, and wherein deformation of the elastic membrane causes the electrically conductive metal layer to contact individual conductor strips thereby bridging respective switching elements defined therein to close the respective switches and provide a voltage drop as the electrical output variable of the sensor switch.

8. The rotational speed control according to claim 7, wherein the elastic membrane further comprises an elastic intermediate layer provided between the displacement means and the elastic membrane and comprised of an elastomer.

9. The rotational speed control according to claim 7, wherein the plurality of electric resistors are integrated into the plurality of conductor strips during metallization thereof.

10. The rotational speed control according to claim 1, wherein the elastic membrane is made of a thin metal sheet.

11. The rotational speed control according to claim 1, wherein the elastic membrane is made of silicon.

12. The rotational speed control according to claim 11, wherein the elastic membrane is a micro-machined membrane formed from a silicon base plate by anisotropic etching thereof.

13. The rotational speed control according to claim 12, wherein the electrically conductive metal layer and the plurality of conductor strips are applied subsequent to the formation of the micro-machined membrane from the silicon base plate, and wherein the plurality of electrical resistors are integrated into the plurality of conductor strips.

14. The process of controlling rotational speed of an electric motor of an electric hand tool, comprising:
   a. providing an electric motor of an electric hand tool with a rotational speed control comprised of:
      (1) displacement means for providing displacement in response to manual operation of the electric hand tool selected from the group consisting essentially of a linear displacement device for providing linear displacement (s) and an actuating dial for providing arcuate displacement (S),
      (2) an elastic membrane to which the displacement means is articulatedly connected via a spring so that during displacement of the displacement means the elastic membrane deforms as a function of the displacement;
      (3) actuating means comprising a sensor element coupled to the elastic membrane so that the sensor element produces an electrical output variable as a function of the deformation of the elastic membrane, the sensor element being selected from the group consisting essentially of a Hall sensor, an inductive sensor, and a sensor switch; and
      (4) an electronic switch for rotational speed control connected to the actuating means, from which it receives the electrical output variable, and to the electric motor of the electric hand tool; and
   b. manually operating the displacement means of the rotational speed control to control the rotational speed of the electric motor.

15. The process according to claim 14, wherein the displacement means comprises a push-button for providing linear displacement (s), and wherein the sensor element is a Hall sensor in which a Hall voltage is generated in use and which includes a magnetic conducting piece which is displaceable, and a semiconductor layer which is stationary and through which a current flows, the displacement (s) of the displacement means in use slidably moving the magnetic conducting piece past the semiconductor layer in a contact-less manner thereby varying the Hall voltage.

16. The process according to claim 14, wherein the displacement means comprises a push-button for providing linear displacement (s) and has a soft-iron rod displaceably mounted thereon, and wherein the sensor element is an inductive sensor having at least one stationary coil through which current flows, the displacement (s) of the push-button in use moving the soft-iron rod past the at least one stationary coil thereby changing the inductance thereof.

17. The process according to claim 14, wherein the displacement means comprises an actuating dial for providing arcuate displacement (S), and wherein the sensor element is a Hall sensor in which a Hall voltage is generated in use and which includes a magnetic conducting piece which is displaceable and positioned on the displacement means, and a semiconductor layer which is stationary and through which a current flows, the arcuate displacement (S) of the actuating dial in use slidably moving the magnetic conducting piece past the semiconductor layer in a contactless manner for the purpose of varying the Hall voltage.

18. The process according to claim 14, wherein the displacement means comprises an actuating dial for providing arcuate displacement (S) and has a soft-iron rod displaceably mounted thereon, and wherein the sensor element is an inductive sensor having at least one stationary coil through which current flows, the arcuate displacement (S) of the actuating dial in use moving the soft-iron rod past the at least one stationary coil thereby changing the inductance thereof.

19. The process according to claim 15, wherein the displacement means further comprises a tappet to which one end of the spring is attached, and wherein the elastic membrane further comprises an elastic intermediate layer positioned between the tappet and the elastic membrane.

20. The process according to claim 14, wherein the sensor element is a sensor switch and comprises a circuit to which a voltage is applied comprised of a plurality of electric resistors connected in series by a plurality of conductor strips, the conductor strips having defined therein a plurality of switching elements, and an electrically conductive metal layer provided on the elastic membrane on the side thereof remote from the displacement means, and wherein deformation of the elastic membrane causes the electrically conductive metal layer to contact individual conductor strips thereby bridging respective switching elements defined therein to close the respective switches and provide a voltage drop as the electrical output variable of the sensor switch.

21. The process according to claim 20, wherein the elastic membrane further comprises an elastic intermediate layer provided between the displacement means and the elastic membrane and comprised of an elastomer.

22. The process according to claim 20, wherein the plurality of electric resistors are integrated into the plurality of conductor strips during metallization thereof.

23. The process according to claim 14, wherein the elastic membrane is made of a thin metal sheet.

24. The process according to claim 14, wherein the elastic membrane is made of silicon.

25. The process according to claim 24, wherein the elastic membrane is a micro-machined membrane formed from a silicon base plate by anisotropic etching thereof.

26. The process according to claim 25, wherein the electrically conductive metal layer and the plurality of conductor strips are applied subsequent to the formation of the micro-machined membrane from the silicon base plate, and wherein the plurality of electrical resistors are integrated into the plurality of conductor strips.

* * * * *

UNITED STATES PATENT AND TRADEMARK OFFICE
CERTIFICATE OF CORRECTION

PATENT NO. : 5,365,155

DATED : November 15, 1994

INVENTOR(S) : Benward Zimmermann

It is certified that error appears in the above-indentified patent and that said Letters Patent is hereby corrected as shown below:

```
Title page,
Insert Item [30] as follows:
        --    Foreign Application Priority Data
  Oct. 20, 1989  [DE]  Germany..........P 39 34 950.0--.
```

Signed and Sealed this

Eighteenth Day of April, 1995

Attest:

BRUCE LEHMAN

*Attesting Officer*

*Commissioner of Patents and Trademarks*